(12) United States Patent
Imaki et al.

(10) Patent No.: US 11,965,985 B2
(45) Date of Patent: Apr. 23, 2024

(54) LASER RADAR DEVICE

(71) Applicant: MITSUBISHI ELECTRIC CORPORATION, Tokyo (JP)

(72) Inventors: Masaharu Imaki, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 873 days.

(21) Appl. No.: 17/039,076

(22) Filed: Sep. 30, 2020

(65) Prior Publication Data

US 2021/0025979 A1 Jan. 28, 2021

Related U.S. Application Data

(63) Continuation-in-part of application No. PCT/JP2018/022770, filed on Jun. 14, 2018.

(51) Int. Cl.
| | | |
|---|---|---|
| *G01S 7/48* | (2006.01) | |
| *G01S 7/486* | (2020.01) | |
| *G01S 17/18* | (2020.01) | |
| *G01S 17/32* | (2020.01) | |

(52) U.S. Cl.
CPC .............. *G01S 7/486* (2013.01); *G01S 17/18* (2020.01); *G01S 17/32* (2013.01)

(58) Field of Classification Search
None
See application file for complete search history.

(56) References Cited

U.S. PATENT DOCUMENTS

| | | |
|---|---|---|
| 2002/0186362 A1 | 12/2002 | Shirai et al. |
| 2006/0265147 A1 | 11/2006 | Yamaguchi et al. |
| 2013/0258312 A1* | 10/2013 | Lewis .................. G01S 7/4865 |
| | | 356/4.01 |

FOREIGN PATENT DOCUMENTS

| | | |
|---|---|---|
| EP | 2 372 389 A1 | 10/2011 |
| JP | 11-325823 A | 11/1999 |
| JP | 2006-258690 A | 9/2006 |
| JP | 2006-308482 A | 11/2006 |

(Continued)

OTHER PUBLICATIONS

Extended European Search Report issued in corresponding European Patent Application No. 18 922 721.8 dated Mar. 19, 2021.

(Continued)

*Primary Examiner* — Hovhannes Baghdasaryan
(74) *Attorney, Agent, or Firm* — Birch, Stewart, Kolasch & Birch, LLP

(57) ABSTRACT

A laser radar device includes a first signal sequence converting unit that converts a transmission signal generated by a transmission signal generating unit into a first pulse signal sequence; a second signal sequence converting unit that converts a reception signal outputted from a reflected light receiving unit into a second pulse signal sequence; and a range calculating unit that calculates a range to a ranging target from a time difference between a time at which transmission light is irradiated by a light irradiating unit and a time at which reflected light is received by the reflected light receiving unit, and an acceptance or refusal selecting unit calculates a degree of match between the first pulse signal sequence and the second pulse signal sequence, and selects or discards the range calculated by the range calculating unit on the basis of the degree of match.

12 Claims, 10 Drawing Sheets

(56) References Cited

FOREIGN PATENT DOCUMENTS

| JP | 2014-232069 A | 12/2014 |
| JP | 2017-138154 A | 8/2017 |
| JP | 2019533145 A * | 11/2019 |

OTHER PUBLICATIONS

European Communication pursuant to Article 94(3) EPC for European Application No. 18922721.8, dated Dec. 15, 2021.
International Search Report, issued in PCT/JP2018/022770, PCT/ISA/210, dated Aug. 28, 2018.

* cited by examiner

LASER RADAR DEVICE

CROSS REFERENCE TO RELATED APPLICATIONS

This application is a Continuation-in-Part of PCT International Application No. PCT/JP2018/022770, filed on Jun. 14, 2018, which is hereby expressly incorporated by reference into the present application.

TECHNICAL FIELD

The invention relates to a laser radar device for calculating a range to a ranging target.

BACKGROUND ART

The following Patent Literature 1 discloses an object detection device that calculates a range to a detection target object.

The object detection device disclosed in Patent Literature 1 calculates a cross-correlation value between a transmission pattern signal outputted from a transmitter and an output signal from a receiver, and calculates a range to a detection target object using the cross-correlation value.

CITATION LIST

Patent Literature

Patent Literature 1: JP 2014-232069 A

SUMMARY OF INVENTION

Technical Problem

The object detection device disclosed in Patent Literature 1 may calculate a cross-correlation value under a situation in which the light intensity of reflected light reflected by a detection target object is low. Under the situation in which the light intensity of reflected light is low, there is a strong influence of noise compared to a situation in which the light intensity of reflected light is high, and thus, the cross-correlation value may decrease.

The object detection device disclosed in Patent Literature 1 employs a scheme in which a range to a detection target object is calculated using a cross-correlation value, and thus has a problem that the accuracy of calculation of a range deteriorates under a situation with low light intensity in which the cross-correlation value decreases.

The invention is made to solve a problem such as that described above, and an object of the invention is to obtain a laser radar device that can prevent a range highly likely to include an error from being outputted as a range to a ranging target when a situation occurs in which the light intensity of reflected light is low.

Solution to Problem

A laser radar device according to the disclosure includes: a transmission signal generator to generate a transmission signal; a light irradiator to convert the transmission signal generated by the transmission signal generator into transmission light, and irradiate a ranging target with the transmission light; a reflected light receiver to receive, as reflected light, the transmission light reflected by the ranging target, and output a reception signal of the reflected light; a first signal sequence converter to convert the transmission signal generated by the transmission signal generator into a first pulse signal sequence; a second signal sequence converter to convert the reception signal outputted from the reflected light receiver into a second pulse signal sequence; a range calculator to calculate a range to the ranging target from a time difference between a time at which the transmission light is irradiated by the light irradiator and a time at which the reflected light is received by the reflected light receiver; and acceptance or refusal selecting circuitry to calculate a degree of match between the first pulse signal sequence and the second pulse signal sequence, and accept or refuse the range calculated by the range calculator on a basis of the degree of match, wherein the second signal sequence converter is configured to output a pulse signal included in the second pulse signal sequence to the acceptance or refusal selecting circuitry at timing at which the differentiated waveform of the reception signal crosses zero, only during a period during which the reception signal outputted from the reflected light receiver is greater than or equal to a second threshold value.

Advantageous Effects of Invention

A laser radar device according to the disclosure can prevent a range highly likely to include an error from being outputted as a range to the ranging target when a situation occurs in which the light intensity of reflected light is low.

DESCRIPTION OF EMBODIMENTS

To describe the invention in more detail, embodiments for carrying out the invention will be described below by referring to the accompanying drawings.

First Embodiment

Figure 1:
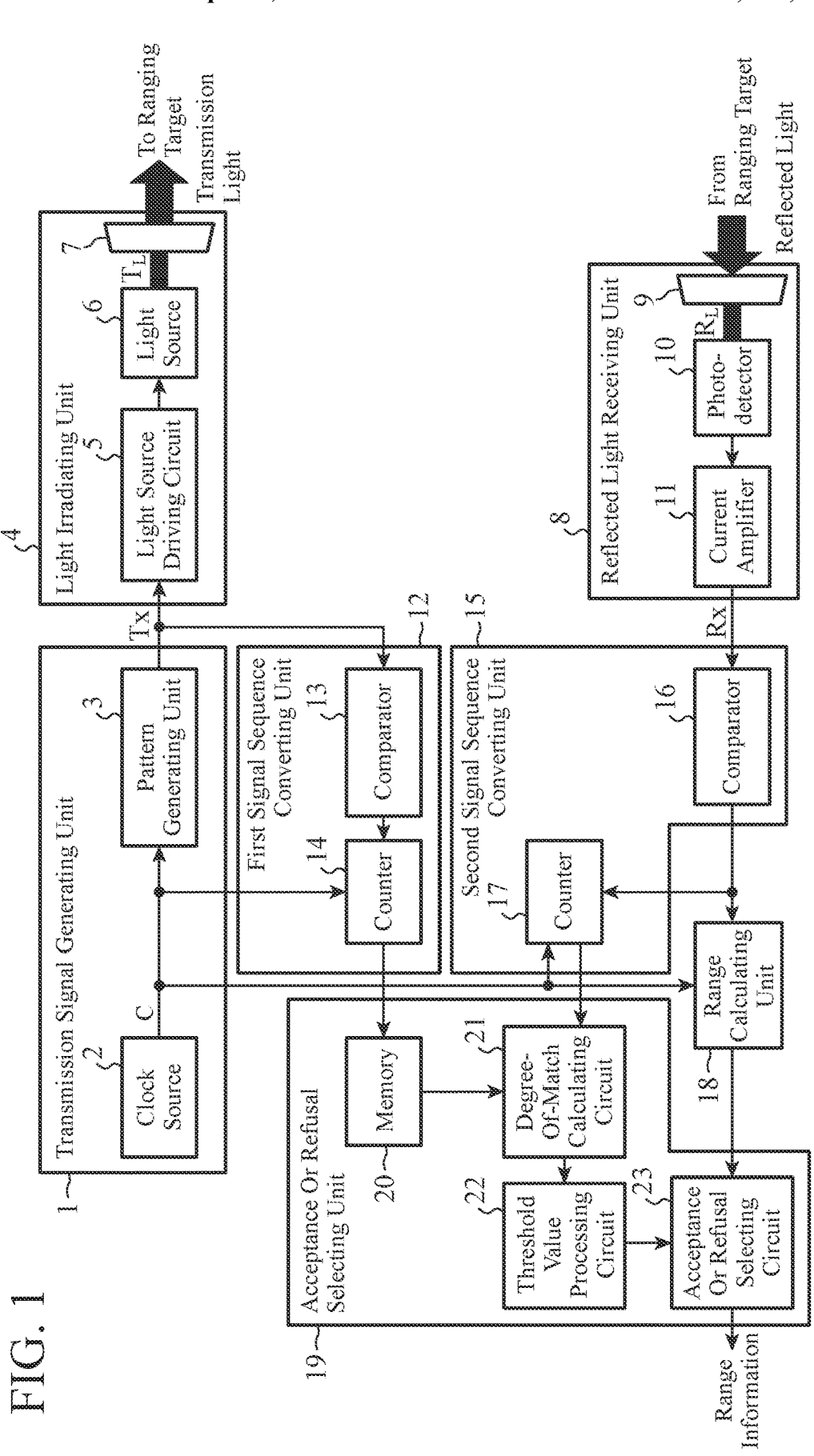
FIG. 1 is a configuration diagram showing a laser radar device according to a first embodiment.

FIG. 1 is a configuration diagram showing a laser radar device according to a first embodiment.

In FIG. 1, a transmission signal generating unit 1 includes a clock source 2 and a pattern generating unit 3.

The transmission signal generating unit 1 generates a transmission signal and outputs the transmission signal to each of a light irradiating unit 4 and a first signal sequence converting unit 12.

The clock source 2 oscillates a clock signal and outputs the clock signal to each of the pattern generating unit 3, a counter 14, a counter 17, and a range calculating unit 18. The range calculating unit 18 may be implemented by dedicated hardware (processing circuitry). Alternatively, the range calculating unit 18 may be implemented by a processor executing a program stored in a memory.

The pattern generating unit 3 generates a transmission signal in synchronization with the clock signal outputted from the clock source 2, and outputs the transmission signal to each of a light source driving circuit 5 and a comparator 13.

The light irradiating unit 4 includes the light source driving circuit 5, a light source 6, and a transmission antenna 7.

The light irradiating unit 4 converts the transmission signal outputted from the transmission signal generating unit 1 into transmission light, and irradiates a ranging target with the transmission light.

The light source driving circuit 5 is a circuit that controls modulation of light to be outputted from the light source 6 on the basis of the amplitude of the transmission signal outputted from the pattern generating unit 3, and thereby allows the light source 6 to output transmission light which is modulated light.

The light source 6 is a light source that outputs the transmission light to the transmission antenna 7.

The transmission antenna 7 is an antenna that irradiates the ranging target with the transmission light.

A reflected light receiving unit 8 includes a reception antenna 9, a photodetector 10, and a current amplifier 11.

The reflected light receiving unit 8 receives, as reflected light, the transmission light irradiated by the transmission antenna 7 and then reflected by the ranging target, and outputs a reception signal of the reflected light to a second signal sequence converting unit 15.

The reception antenna 9 is an antenna that receives the transmission light reflected by the ranging target, as reflected light.

The photodetector 10 detects the reflected light received by the reception antenna 9, and outputs a detection signal of the reflected light to the current amplifier 11.

The current amplifier 11 amplifies the detection signal outputted from the photodetector 10, and outputs the amplified detection signal as a reception signal to a comparator 16.

The first signal sequence converting unit 12 includes the comparator 13 and the counter 14.

The first signal sequence converting unit 12 converts the transmission signals outputted from the transmission signal generating unit 1 into a first pulse signal sequence, and outputs the first pulse signal sequence to an acceptance or refusal selecting unit 19.

The comparator 13 compares the transmission signal outputted from the pattern generating unit 3 with a first threshold value $Th_1$.

If the transmission signal is greater than or equal to the first threshold value $Th_1$ then the comparator 13 outputs a high-level signal to the counter 14, while if the transmission signal is less than the first threshold value $Th_1$ then the comparator 13 outputs a low-level signal to the counter 14.

The first threshold value $Th_1$ may be stored in an internal memory of the comparator 13 or may be provided from an external source.

The counter 14 generates a first pulse signal sequence by arranging output signals from the comparator 13 in such a manner that a point in time when the counter 14 receives a high-level signal from the comparator 13 for the first time after receiving the clock signal from the clock source 2 serves as a starting point, and stores the first pulse signal sequence in a memory 20.

The second signal sequence converting unit 15 includes the comparator 16 and the counter 17.

The second signal sequence converting unit 15 converts the reception signals outputted from the reflected light receiving unit 8 into a second pulse signal sequence, and outputs the second pulse signal sequence to the acceptance or refusal selecting unit 19.

The comparator 16 compares the reception signal outputted from the current amplifier 11 with a second threshold value $Th_2$.

If the reception signal is greater than or equal to the second threshold value $Th_2$ then the comparator 16 outputs a high-level signal to each of the counter 17 and the range calculating unit 18, while if the reception signal is less than the second threshold value $Th_2$ then the comparator 16 outputs a low-level signal to each of the counter 17 and the range calculating unit 18.

The second threshold value $Th_2$ may be stored in an internal memory of the comparator 16 or may be provided from an external source.

The second threshold value $Th_2$ may be the same value as the first threshold value $Th_1$ or may be a different value than the first threshold value $Th_1$.

The counter 17 generates a second pulse signal sequence by arranging output signals from the comparator 16 in such a manner that a point in time when the counter 17 receives a high-level signal for the first time from the comparator 16 after receiving the clock signal from the clock source 2 serves as a starting point, and outputs the second pulse signal sequence to a degree-of-match calculating circuit 21.

The range calculating unit 18 is implemented by, for example, a time-to-digital converter (TDC).

The range calculating unit 18 calculates a time at which the transmission light is irradiated by the transmission antenna 7 by adding processing time of each of the pattern generating unit 3, the light source driving circuit 5, and the light source 6 to a time at which the clock signal is outputted from the clock source 2.

The range calculating unit 18 obtains a time at which a high-level signal is outputted from the comparator 16 for the first time after the clock signal is outputted from the clock source 2.

The range calculating unit 18 calculates a time at which the reflected light is received by the reception antenna 9 by subtracting processing time of each of the photodetector 10, the current amplifier 11, and the comparator 16 from the time at which a high-level signal is outputted from the comparator 16 for the first time.

The range calculating unit 18 calculates a range to the ranging target from a time difference between the time at which the transmission light is irradiated by the transmission antenna 7 and the time at which the reflected light is received by the reception antenna 9, and outputs range information indicating the calculated range to the acceptance or refusal selecting unit 19.

The acceptance or refusal selecting unit 19 includes the memory 20, the degree-of-match calculating circuit 21, a threshold value processing circuit 22, and a acceptance or refusal selecting circuit 23.

The acceptance or refusal selecting unit 19 calculates a degree of match between the first pulse signal sequence and the second pulse signal sequence, and selects or discards ranges outputted from the range calculating unit 18 on the basis of the degree of match.

The memory 20 is a storage medium that stores the first pulse signal sequence outputted from the counter 14.

The degree-of-match calculating circuit 21 calculates a degree of match between the first pulse signal sequence stored in the memory 20 and the second pulse signal sequence outputted from the counter 17, and outputs the degree of match to the threshold value processing circuit 22.

The threshold value processing circuit 22 compares the degree of match outputted from the degree-of-match calculating circuit 21 with a third threshold value $Th_3$.

If the degree of match is greater than or equal to the third threshold value $Th_3$, then the threshold value processing circuit 22 outputs a control signal $S_1$ instructing to accept the range calculated by the range calculating unit 18 to the acceptance or refusal selecting circuit 23.

If the degree of match is less than the third threshold value $Th_3$, then the threshold value processing circuit 22 outputs a control signal $S_2$ instructing to discard the range calculated by the range calculating unit 18 to the acceptance or refusal selecting circuit 23.

The third threshold value $Th_3$ may be stored in an internal memory of the threshold value processing circuit 22 or may be provided from an external source.

If the acceptance or refusal selecting circuit 23 receives the control signal $S_1$ from the threshold value processing circuit 22 then the acceptance or refusal selecting circuit 23 outputs the range information outputted from the range calculating unit 18 to an external source, while if the acceptance or refusal selecting circuit 23 receives the control signal $S_2$ from the threshold value processing circuit 22 then the acceptance or refusal selecting circuit 23 discards the range information outputted from the range calculating unit 18.

Next, operations of the laser radar device shown in FIG. 1 will be described.

Figure 2:
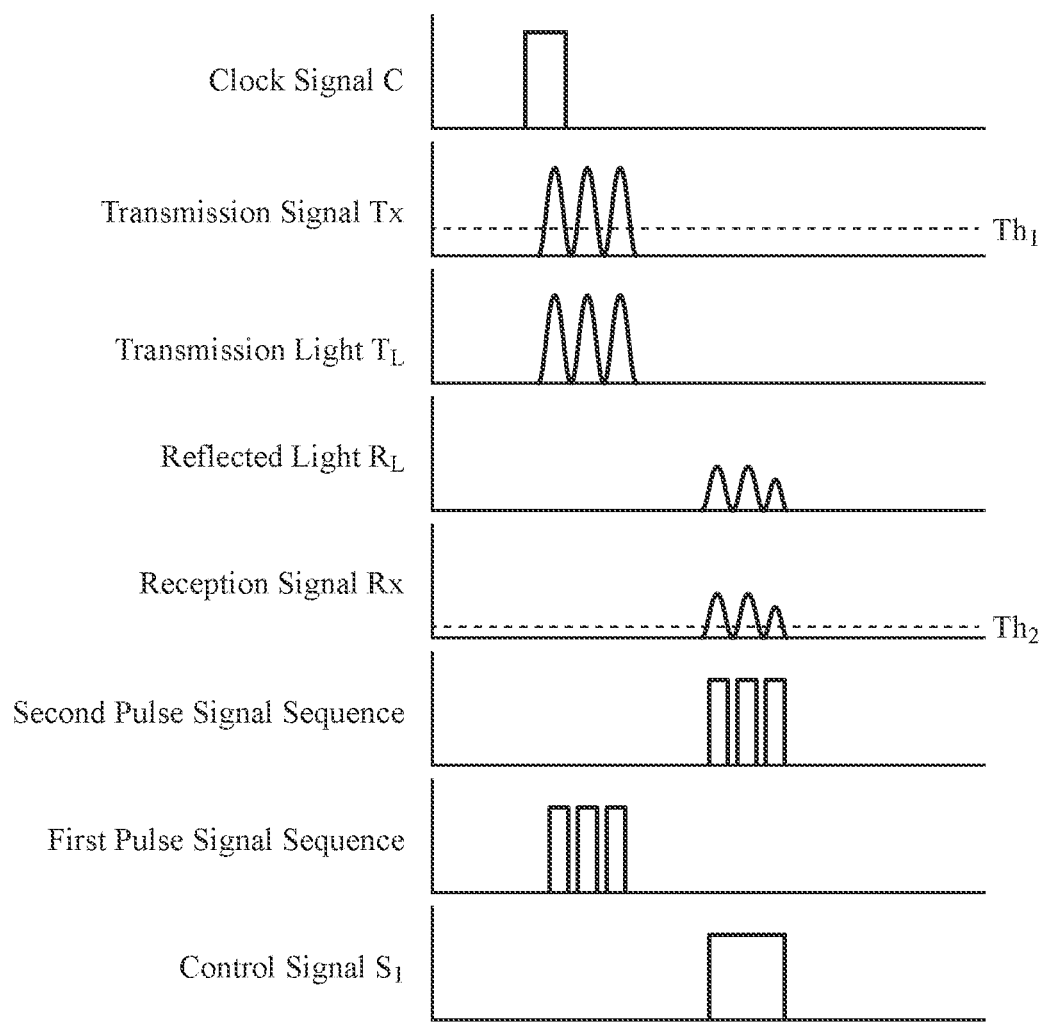
FIG. 2 is an explanatory diagram showing the waveforms of signals outputted from respective components of the laser radar device shown in FIG. 1.

FIG. 2 is an explanatory diagram showing the waveforms of signals outputted from respective components of the laser radar device shown in FIG. 1.

First, the clock source 2 oscillates a clock signal C such as that shown in FIG. 2, and outputs the clock signal C to each of the pattern generating unit 3, the counter 14, the counter 17, and the range calculating unit 18.

When the pattern generating unit 3 receives the clock signal C from the clock source 2, the pattern generating unit 3 generates a transmission signal Tx in synchronization with the clock signal C.

The pattern generating unit 3 outputs the transmission signal Tx to each of the light source driving circuit 5 and the comparator 13.

The transmission signal Tx generated by the pattern generating unit 3 may be a transmission signal whose amplitude changes with the passage of time or may be a pulse signal.

In addition, the pattern generating unit 3 may generate a transmission signal Tx whose changes in amplitude vary each time the transmission signal Tx is outputted, or may generate the same transmission signal Tx every time.

The transmission signal Tx shown in FIG. 2 is a signal in which three mountain-shaped waveforms are arranged.

When the light source driving circuit 5 receives the transmission signal Tx from the pattern generating unit 3, the light source driving circuit 5 controls modulation of light to be outputted from the light source 6, on the basis of the amplitude of the transmission signal Tx.

The light source 6 is controlled by the light source driving circuit 5 to output transmission light $T_L$ such as that shown in FIG. 2 to the transmission antenna 7.

The transmission antenna 7 irradiates a ranging target with the transmission light $T_L$ outputted from the light source 6.

The transmission light $T_L$ irradiated by the transmission antenna 7 is reflected by the ranging target, and reflected light $R_L$ of the transmission light $T_L$ arrives at the reception antenna 9.

The reflected light $R_L$ shown in FIG. 2 has three mountain-shaped waveforms arranged therein as with the transmission light $T_L$, but the amplitude (light intensity) of the third waveform is reduced compared to the amplitude of the first waveform and the amplitude of the second waveform.

The reception antenna 9 receives the reflected light $R_L$.

The photodetector 10 detects the reflected light $R_L$ received by the reception antenna 9, and outputs a detection signal of the reflected light $R_L$ to the current amplifier 11.

When the current amplifier 11 receives the detection signal of the reflected light $R_L$ from the photodetector 10, the current amplifier 11 amplifies the detection signal of the reflected light $R_L$ and outputs the amplified detection signal as a reception signal Rx to the comparator 16.

When the comparator 13 receives the transmission signal Tx from the transmission signal generating unit 1, the comparator 13 compares the transmission signal Tx with the first threshold value $Th_1$.

If the transmission signal Tx is greater than or equal to the first threshold value $Th_1$ then the comparator 13 outputs a high-level signal to the counter 14, while if the transmission signal Tx is less than the first threshold value $Th_1$ then the comparator 13 outputs a low-level signal to the counter 14.

The counter 14 generates a first pulse signal sequence such as that shown in FIG. 2 by arranging output signals from the comparator 13 in such a manner that a point in time when the counter 14 receives a high-level signal from the comparator 13 for the first time after receiving the clock signal C from the clock source 2 serves as a starting point.

The counter 14 stores the first pulse signal sequence in the memory 20.

The transmission signal Tx shown in FIG. 2 is a signal in which three mountain-shaped waveforms are arranged, and the amplitude of each of the three mountain-shaped waveforms is greater than or equal to the first threshold value $Th_1$, and thus, the first pulse signal sequence is a signal sequence in which three pulse signals are arranged.

When the comparator 16 receives the reception signal Rx from the reflected light receiving unit 8, the comparator 16 compares the reception signal Rx with the second threshold value $Th_2$.

When the reception signal Rx is greater than or equal to the second threshold value $Th_2$, the comparator 16 outputs a high-level signal to each of the counter 17 and the range calculating unit 18.

When the reception signal Rx is less than the second threshold value $Th_2$, the comparator 16 outputs a low-level signal to each of the counter 17 and the range calculating unit 18.

The counter 17 generates a second pulse signal sequence such as that shown in FIG. 2 by arranging output signals from the comparator 16 in such a manner that a point in time when the counter 17 receives a high-level signal from the comparator 16 for the first time after receiving the clock signal C from the clock source 2 serves as a starting point.

The counter 17 outputs the second pulse signal sequence to the degree-of-match calculating circuit 21.

The reception signal Rx shown in FIG. 2 is a signal in which three mountain-shaped waveforms are arranged, and the amplitude of each of the three mountain-shaped waveforms is greater than or equal to the second threshold value $Th_2$, and thus, the second pulse signal sequence is a signal sequence in which three pulse signals are arranged.

The amplitude of the third waveform is reduced compared to the amplitude of the first waveform and the amplitude of the second waveform, but is greater than or equal to the second threshold value $Th_2$, and thus, a pulse signal is generated. That is, even when a situation occurs in which the light intensity of the reflected light $R_L$ is low, if the reduction in light intensity is not so great that the amplitude falls below the second threshold value $Th_2$, then a pulse signal is generated by the counter 17.

When the range calculating unit 18 receives the clock signal C from the clock source 2, the range calculating unit 18 obtains a time $t_{c1}$ at which the clock signal C is outputted from the clock source 2, by referring to an internal clock or an external clock.

The range calculating unit 18 calculates a time $t_T$ at which the transmission light $T_L$ is irradiated by the transmission antenna 7 by adding processing time $T_{p1}$ of each of the pattern generating unit 3, the light source driving circuit 5, and the light source 6 to the time $t_{c1}$, as shown in the following equation (1):

$$t_T = t_{c1} + T_{p1} \quad (1)$$

The processing time $T_{p1}$ may be stored in an internal memory of the range calculating unit 18 or may be provided from an external source.

The range calculating unit 18 obtains a time $t_{c2}$ at which a high-level signal is outputted from the comparator 16 for the first time after the clock signal C is outputted from the clock source 2, by referring to the internal clock or external clock.

The range calculating unit 18 calculates a time $t_R$ at which the reflected light $R_L$ is received by the reception antenna 9 by subtracting processing time $T_{p2}$ of each of the photodetector 10, the current amplifier 11, and the comparator 16 from the time $t_{c2}$, as shown in the following equation (2):

$$t_R = t_{c2} - T_{p2} \quad (2)$$

The processing time $T_{p2}$ may be stored in the internal memory of the range calculating unit 18 or may be provided from an external source.

The range calculating unit 18 calculates a range to the ranging target from a time difference $|t_T - t_R|$ between the time $t_T$ at which the transmission light $T_L$ is irradiated by the transmission antenna 7 and the time $t_R$ at which the reflected light $R_L$ is received by the reception antenna 9.

A process itself of calculating a range from the time difference $|t_T - t_R|$ is a publicly known technique and thus a detailed description thereof is omitted.

The range calculating unit 18 outputs range information indicating the range to the acceptance or refusal selecting circuit 23.

The degree-of-match calculating circuit 21 calculates a degree of match between the first pulse signal sequence stored in the memory 20 and the second pulse signal sequence outputted from the counter 17, and outputs the degree of match to the threshold value processing circuit 22.

The first pulse signal sequence shown in FIG. 2 is a signal sequence whose signal level changes in such a manner that "H"->"L"->"H"->"L"->"H".

The second pulse signal sequence shown in FIG. 2 is a signal sequence whose signal level changes in such a manner that "H"->"L"->"H"->"L"->"H".

Therefore, the degree of match between the first pulse signal sequence and the second pulse signal sequence is 100%.

The second pulse signal sequence shown in FIG. 2 is a signal sequence whose signal level changes in such a manner that "H"->"L"->"H"->"L"->"H". If a situation occurs in which the amplitude of the third waveform is greatly reduced and is less than the second threshold value $Th_2$, the third pulse signal is not generated.

Figure 3:
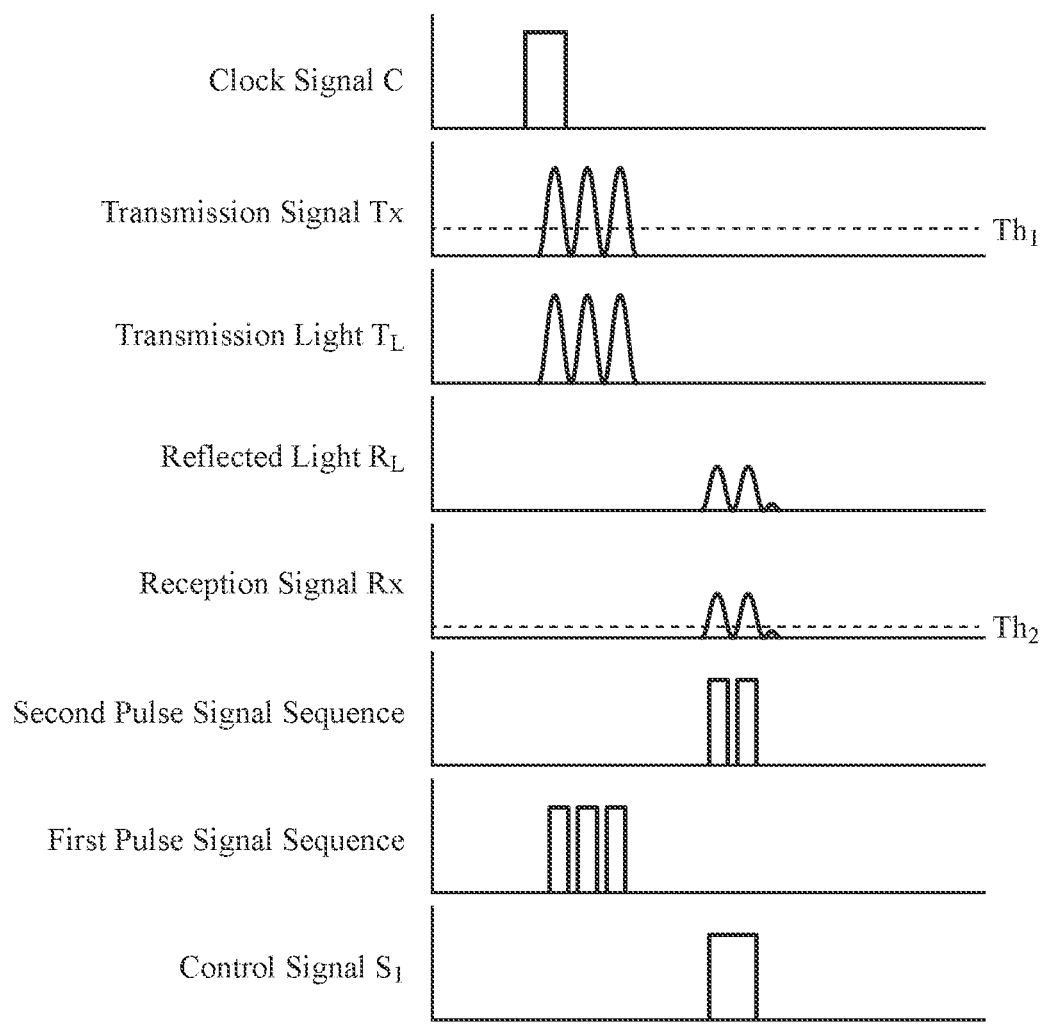
FIG. 3 is an explanatory diagram showing the waveforms of signals outputted from the respective components of the laser radar device shown in FIG. 1.

A second pulse signal sequence shown in FIG. 3 shows a signal sequence at a time when the amplitude of the third waveform is greatly reduced, and the signal level changes in such a manner that "H"->"L"->"H".

When the amplitude of the third waveform is greatly reduced, among the five signal levels of the first pulse signal sequence, three signal levels match the signal levels of the second pulse signal sequence and two signal levels do not match the signal levels of the second pulse signal sequence.

Therefore, the degree of match between the first pulse signal sequence and the second pulse signal sequence is $(3/5) \times 100 = 66.7\%$.

In addition, a situation may also occur in which each of the amplitude of the first waveform and the amplitude of the second waveform is greatly reduced. When a situation occurs in which each of the amplitude of the first waveform and the amplitude of the second waveform is less than the second threshold value $Th_2$, each of a pulse signal corresponding to the first waveform and a pulse signal corresponding to the second waveform is not generated.

Figure 4:
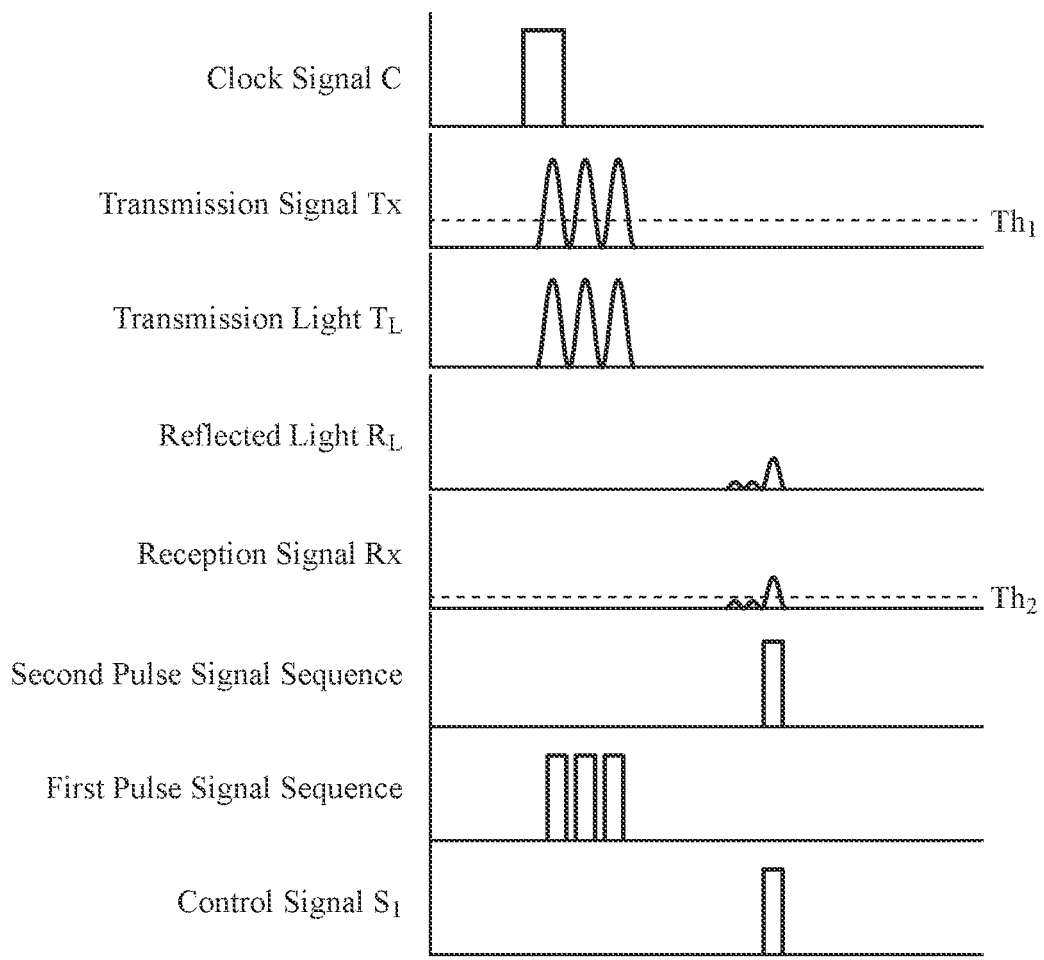
FIG. 4 is an explanatory diagram showing the waveforms of signals outputted from the respective components of the laser radar device shown in FIG. 1.

A second pulse signal sequence shown in FIG. 4 shows a signal sequence at a time when the amplitude of the first waveform and the amplitude of the second waveform are greatly reduced, and is a signal sequence whose signal level is "H".

When each of the amplitude of the first waveform and the amplitude of the second waveform is greatly reduced, among the five signal levels of the first pulse signal sequence, only one signal level matches the signal level of the second pulse signal sequence.

Therefore, the degree of match between the first pulse signal sequence and the second pulse signal sequence is $(1/5) \times 100 = 20\%$.

The threshold value processing circuit 22 compares the degree of match outputted from the degree-of-match calculating circuit 21 with the third threshold value $Th_3$.

When the degree of match is greater than or equal to the third threshold value $Th_3$, the threshold value processing circuit 22 outputs a control signal $S_1$ instructing to accept the range calculated by the range calculating unit 18 to the acceptance or refusal selecting circuit 23.

When the degree of match is less than the third threshold value $Th_3$, the threshold value processing circuit 22 outputs a control signal $S_2$ instructing to discard the range calculated by the range calculating unit 18 to the acceptance or refusal selecting circuit 23.

In a case in which, for example, the third threshold value $Th_3$ is set to 60%, if the degree of match is greater than or equal to 60%, then the threshold value processing circuit 22 outputs a control signal $S_1$ instructing to accept the range calculated by the range calculating unit 18 to the acceptance or refusal selecting circuit 23.

If the degree of match is less than 60%, then the threshold value processing circuit 22 outputs a control signal $S_2$ instructing to discard the range calculated by the range calculating unit 18 to the acceptance or refusal selecting circuit 23.

If the acceptance or refusal selecting circuit 23 receives the control signal $S_1$ from the threshold value processing circuit 22 then the acceptance or refusal selecting circuit 23 outputs the range information outputted from the range calculating unit 18 to an external source, while if the acceptance or refusal selecting circuit 23 receives the control signal $S_2$ from the threshold value processing circuit 22 then the acceptance or refusal selecting circuit 23 discards the range information outputted from the range calculating unit 18.

Here, for convenience of description, it is assumed that the third threshold value $Th_3$ is set to 60%.

In a case in which the second pulse signal sequence outputted from the counter 17 is the second pulse signal sequence shown in FIG. 2, since the degree of match is 100% which is greater than or equal to the third threshold value $Th_3$, the range calculated by the range calculating unit 18 is accepted.

In a case in which the second pulse signal sequence outputted from the counter 17 is the second pulse signal sequence shown in FIG. 3, since the degree of match is 66.7% which is greater than or equal to the third threshold value $Th_3$, the range calculated by the range calculating unit 18 is accepted. Thus, in such a reduction in the light intensity of the reflected light $R_L$ that one pulse signal out of three pulse signals is not generated, the acceptance or refusal selecting circuit 23 recognizes that the range calculated by the range calculating unit 18 is less likely to include an error, and thus, accepts the range.

However, if the second pulse signal sequence outputted from the counter 17 is the second pulse signal sequence shown in FIG. 4, since the degree of match is 20% which is less than the third threshold value $Th_3$, the range calculated by the range calculating unit 18 is discarded. Thus, under a situation with large signal degradation in which two pulse signals out of three pulse signals are not generated, the acceptance or refusal selecting circuit 23 recognizes that the range calculated by the range calculating unit 18 is highly likely to include an error, and thus, discards the range.

Note that when a situation occurs in which each of the amplitude of the first waveform and the amplitude of the second waveform is less than the second threshold value $Th_2$, the time $t_{c2}$ at which a high-level signal is outputted from the comparator 16 for the first time is a time at which a high-level signal corresponding to the third waveform is outputted.

Because of this, even if the processing time $T_{p2}$ is subtracted from the above-described time, the time $t_R$ at which the reflected light $R_L$ is received by the reception antenna 9 cannot be obtained, and thus, the range calculated by the range calculating unit 18 is a range including an error, and it is reasonable to discard the range.

The reflected light $R_L$ shown in FIG. 2 does not include disturbance pulse light D, and the reception antenna 9 receives only the reflected light $R_L$.

However, the reception antenna 9 may receive disturbance pulse light D in addition to the reflected light $R_L$.

Figure 5:
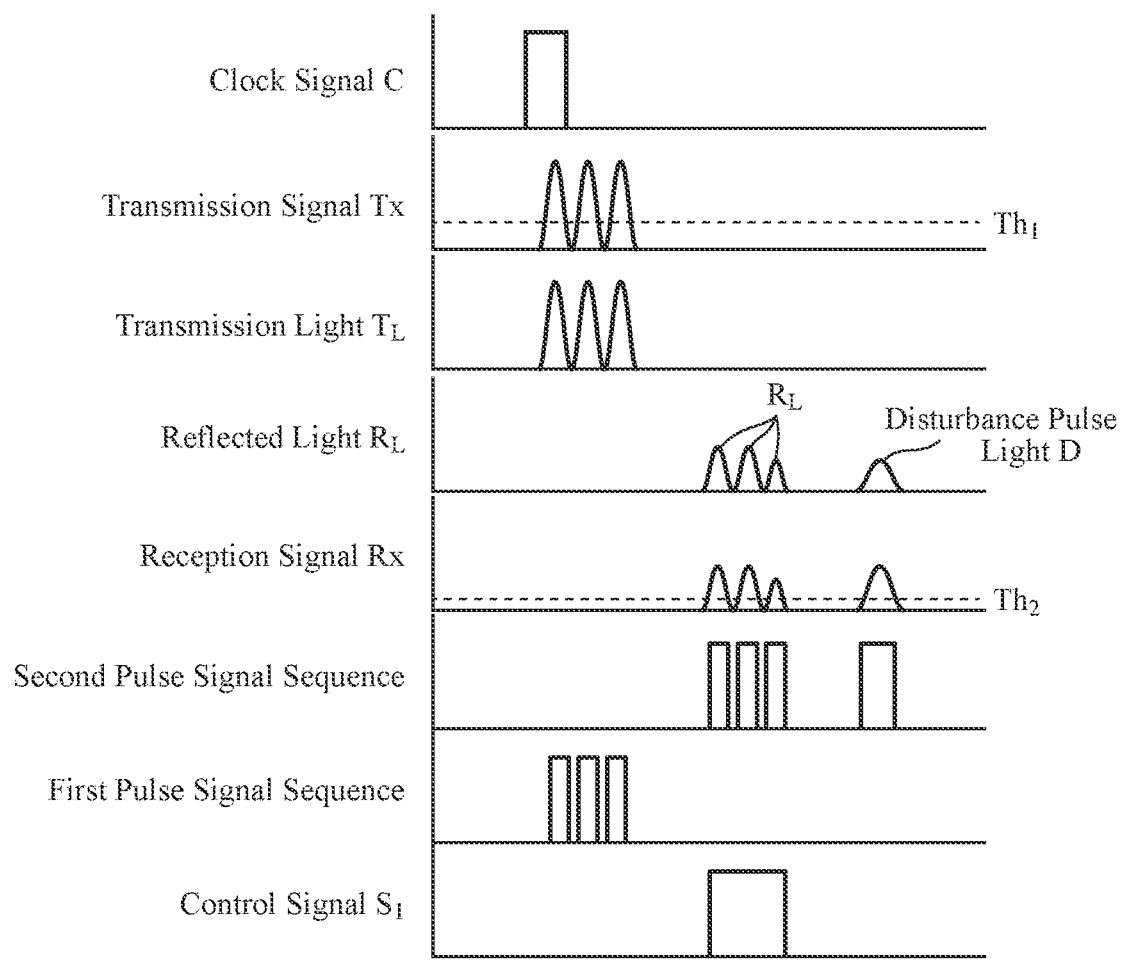
FIG. 5 is an explanatory diagram showing the waveforms of signals outputted from the respective components of the laser radar device shown in FIG. 1.

FIG. 5 is an explanatory diagram showing the waveforms of signals outputted from the respective components of the laser radar device shown in FIG. 1.

Reflected light $R_L$ shown in FIG. 5 includes one piece of disturbance pulse light D.

Since the amplitude of the disturbance pulse light D shown in FIG. 5 is greater than or equal to the second threshold value $Th_2$, a pulse signal corresponding to the disturbance pulse light D is generated.

Therefore, a second pulse signal sequence outputted from the counter 17 is a signal sequence in which four pulse signals are arranged, and the signal level of the second pulse signal sequence changes, for example, in such a manner that "H"->"L"->"H"->"L"->"H"->"L"->"H".

In this case, among the seven signal levels of the second pulse signal sequence, five signal levels match the signal levels of the first pulse signal sequence, but among the seven signal levels, two signal levels do not match the signal levels of the first pulse signal sequence.

Therefore, the degree of match between the first pulse signal sequence and the second pulse signal sequence is (5/7)×100=71.4%.

Even when one piece of disturbance pulse light D is received, if the second pulse signal sequence outputted from the counter 17 is a signal sequence that changes in such a manner that "H"->"L"->"H"->"L"->"H"->"L"->"H", then the degree of match is greater than or equal to the third threshold value $Th_3$. Thus, the acceptance or refusal selecting circuit 23 recognizes that the range calculated by the range calculating unit 18 is less likely to include an error, and thus, accepts the range.

Furthermore, there is also a case in which two pieces of disturbance pulse light D are included.

In the case in which two disturbance pulse lights D are included, the signal level of the second pulse signal sequence may change, for example, in such a manner that "H"->"L"->"H"->"L"->"H"->"L"->"H"->"L"->"H".

In this case, among the nine signal levels of the second pulse signal sequence, five signal levels match the signal levels of the first pulse signal sequence, but among the nine signal levels, four signal levels do not match the signal levels of the first pulse signal sequence.

Therefore, the degree of match between the first pulse signal sequence and the second pulse signal sequence is (5/9)×100=55.6%.

When two pieces of disturbance pulse light D are received and the second pulse signal sequence outputted from the counter 17 is a signal sequence that changes in such a manner that "H"->"L"->"H"->"L"->"H"->"L"->"H"->"L"->"H", the degree of match is less than the third threshold value $Th_3$. Thus, the acceptance or refusal selecting circuit 23 recognizes that the range calculated by the range calculating unit 18 is highly likely to include an error, and thus, discards the range.

Furthermore, the reception antenna 9 may receive only disturbance pulse light D before receiving the reflected light $R_L$.

When the reception antenna 9 receives only one piece of disturbance pulse light D before receiving the reflected light $R_L$, the second pulse signal sequence is a signal sequence whose signal level is "H".

In this case, among the five signal levels of the first pulse signal sequence, one signal level matches the signal level of the second pulse signal sequence, but among the five signal levels, four signal levels do not match the signal levels of the second pulse signal sequence.

Therefore, the degree of match between the first pulse signal sequence and the second pulse signal sequence is (1/5)×100=20%.

When the reception antenna 9 receives only one piece of disturbance pulse light D before receiving the reflected light $R_L$, the degree of match is less than the third threshold value $Th_3$. Thus, the acceptance or refusal selecting circuit 23 recognizes that the range calculated by the range calculating unit 18 is highly likely to include an error, and thus, discards the range.

In the above-described first embodiment, the laser radar device is configured in such a manner that the laser radar device includes the first signal sequence converting unit 12 that converts a transmission signal generated by the transmission signal generating unit 1 into a first pulse signal sequence; the second signal sequence converting unit 15 that converts a reception signal outputted from the reflected light receiving unit 8 into a second pulse signal sequence; and the range calculating unit 18 that calculates a range to a ranging target from a time difference between a time at which transmission light is irradiated by the light irradiating unit 4 and a time at which reflected light is received by the reflected light receiving unit 8, and the acceptance or refusal selecting unit 19 calculates a degree of match between the first pulse signal sequence and the second pulse signal sequence, and selects or discards the range calculated by the range calculating unit 18 on the basis of the degree of match. Therefore, the laser radar device can prevent a range that is highly likely to include an error from being outputted as a range to the ranging target when a situation occurs in which the light intensity of reflected light is low.

In the laser radar device shown in FIG. 1, the third threshold value $Th_3$ is set to 60%, and therefore if the degree of match is greater than or equal to 60%, even when the degree of match is not 100%, the acceptance or refusal selecting circuit 23 accepts a range calculated by the range calculating unit 18.

Thus, even when a first pulse signal sequence and a second pulse signal sequence do not completely match each other, if the possibility of inclusion of an error is low, then the acceptance or refusal selecting circuit 23 accepts the range calculated by the range calculating unit 18. Thus, even when a second pulse signal sequence outputted from the second signal sequence converting unit 15 is, for example, the second pulse signal sequence shown in FIG. 3 or 5, the acceptance or refusal selecting circuit 23 can accept the range calculated by the range calculating unit 18.

Note, however, that when a situation occurs in which, in a reception signal Rx in which three mount-shaped waveforms are arranged, only the amplitude of the first waveform is greatly reduced and the amplitude of the first waveform is less than the second threshold value $Th_2$, a pulse signal corresponding to the first waveform is not generated. In this case, the degree of match is 66.7% which is greater than or equal to the third threshold value $Th_3$, and thus, the acceptance or refusal selecting circuit 23 accepts the range calculated by the range calculating unit 18.

In the case in which a pulse signal corresponding to the first waveform is not generated, the time $t_{c2}$ at which a high-level signal is outputted from the comparator 16 for the first time is a time at which a high-level signal corresponding to the second waveform is outputted.

Because of this, even if the processing time $T_{p2}$ is subtracted from the above-described time, the time $t_R$ at which the reflected light $R_L$ is received by the reception antenna 9 cannot be obtained, and thus, the range calculated by the range calculating unit 18 is a range including an error, and it is essentially reasonable to discard the range.

If the third threshold value $Th_3$ is set to, for example, 100%, outputting a range that is highly likely to include an error as a range to the ranging target can be more accurately prevented.

Namely, in a case in which the third threshold value $Th_3$ is set to 100%, only when the first pulse signal sequence and the second pulse signal sequence completely match each other, the acceptance or refusal selecting circuit 23 accepts the range calculated by the range calculating unit 18. Therefore, under a situation in which only the amplitude of the first waveform is greatly reduced, too, outputting a range that includes an error can be prevented.

Second Embodiment

In the laser radar device of the first embodiment, the first signal sequence converting unit 12 converts a transmission signal Tx outputted from the transmission signal generating unit 1 into a first pulse signal sequence, and the second signal sequence converting unit 15 converts a reception signal Rx outputted from the reflected light receiving unit 8 into a second pulse signal sequence.

A second embodiment describes a laser radar device in which a first signal sequence converting unit 43 converts a transmission signal Tx into a first pulse signal sequence at the same periods as periods at which the amplitude of the transmission signal Tx changes, and a second signal sequence converting unit 45 converts a reception signal Rx into a second pulse signal sequence at the same periods as the periods at which the amplitude of the transmission signal Tx changes.

Figure 6:
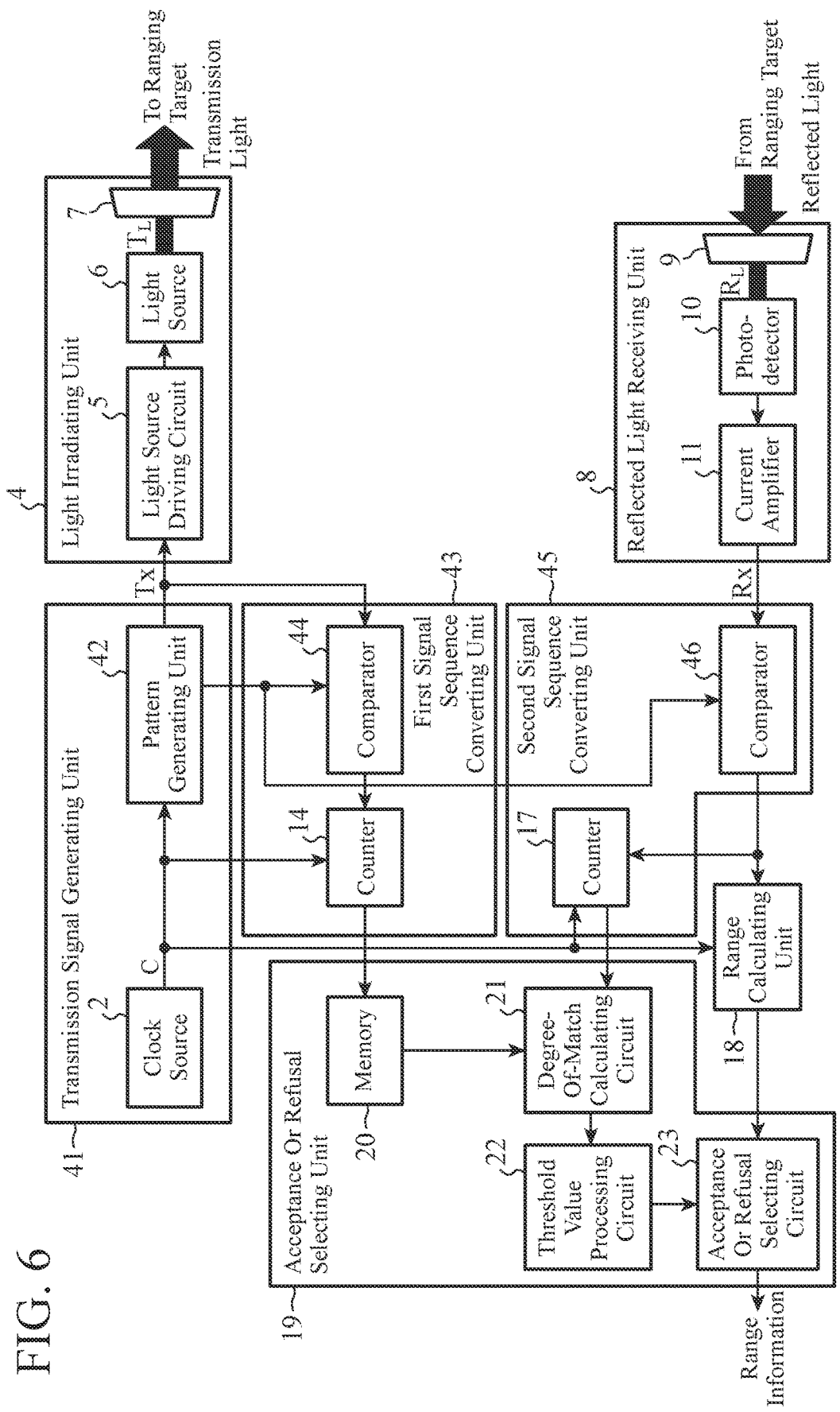
FIG. 6 is a configuration diagram showing a laser radar device according to a second embodiment.

FIG. 6 is a configuration diagram showing a laser radar device according to the second embodiment. In FIG. 6, the same reference signs as those of FIG. 1 indicate the same or corresponding portions and thus description thereof is omitted.

A transmission signal generating unit 41 includes the clock source 2 and a pattern generating unit 42.

The transmission signal generating unit 41 generates a transmission signal Tx whose amplitude changes with the passage of time, and outputs the transmission signal Tx to each of the light irradiating unit 4 and the first signal sequence converting unit 43.

In addition, the transmission signal generating unit 41 outputs period information indicating periods at which the amplitude of the transmission signal Tx changes, to each of the first signal sequence converting unit 43 and the second signal sequence converting unit 45.

The pattern generating unit 42 generates a transmission signal Tx whose amplitude changes with the passage of time, in synchronization with a clock signal C outputted from the clock source 2, and outputs the transmission signal Tx to each of the light source driving circuit 5 and a comparator 44.

In addition, the pattern generating unit 42 outputs the period information indicating the periods at which the amplitude of the transmission signal Tx changes, to each of the comparator 44 and a comparator 46.

The first signal sequence converting unit 43 includes the comparator 44 and the counter 14.

When the first signal sequence converting unit 43 receives the clock signal C from the transmission signal generating unit 41, the first signal sequence converting unit 43 converts the transmission signal Tx into a first pulse signal sequence at the same periods as the periods indicated by the period information outputted from the transmission signal generating unit 41, and outputs the first pulse signal sequence to the acceptance or refusal selecting unit 19.

The comparator 44 compares the transmission signal Tx outputted from the pattern generating unit 42 with the first threshold value $Th_1$ at the same periods as the periods indicated by the period information outputted from the pattern generating unit 42.

If the transmission signal Tx is greater than or equal to the first threshold value $Th_1$, then the comparator 44 outputs a high-level signal to the counter 14, or if the transmission signal Tx is less than the first threshold value $Th_1$, then the comparator 44 outputs a low-level signal to the counter 14.

The first threshold value $Th_1$ may be stored in an internal memory of the comparator 44 or may be provided from an external source.

The second signal sequence converting unit 45 includes the comparator 46 and the counter 17.

When the second signal sequence converting unit 45 receives the clock signal C from the transmission signal generating unit 41, the second signal sequence converting unit 45 converts a reception signal Rx outputted from the reflected light receiving unit 8 into a second pulse signal sequence at the same periods as the periods indicated by the period information outputted from the transmission signal generating unit 41.

The second signal sequence converting unit 45 outputs the second pulse signal sequence to the acceptance or refusal selecting unit 19.

The comparator 46 compares the reception signal Rx outputted from the current amplifier 11 with the second threshold value $Th_2$ at the same periods as the periods indicated by the period information outputted from the pattern generating unit 42.

If the reception signal Rx is greater than or equal to the second threshold value $Th_2$, then the comparator 46 outputs a high-level signal to each of the counter 17 and the range calculating unit 18.

If the reception signal Rx is less than the second threshold value $Th_2$, then the comparator 46 outputs a low-level signal to each of the counter 17 and the range calculating unit 18.

The second threshold value $Th_2$ may be stored in an internal memory of the comparator 46 or may be provided from an external source.

The second threshold value $Th_2$ may be the same value as the first threshold value $Th_1$ or may be a different value than the first threshold value $Th_1$.

Next, operations of the laser radar device shown in FIG. 6 will be described.

Here, only operations of components that differ from the laser radar device shown in FIG. 1 will be described.

When the pattern generating unit 42 receives a clock signal C from the clock source 2, the pattern generating unit 42 generates a transmission signal Tx whose amplitude changes with the passage of time, in synchronization with the clock signal C and outputs the transmission signal Tx to each of the light source driving circuit 5 and the comparator 44.

For example, the transmission signal Tx shown in FIG. 2 is a signal in which three mountain-shaped waveforms are arranged at the same period.

In addition, the pattern generating unit 42 outputs period information indicating the periods of the respective mountain-shaped waveforms as periods at which the amplitude of the transmission signal Tx changes, to each of the comparator 44 and the comparator 46.

The comparator 44 compares the transmission signal Tx outputted from the pattern generating unit 42 with the first threshold value $Th_1$ at the same periods as the periods indicated by the period information outputted from the pattern generating unit 42.

If the transmission signal Tx is greater than or equal to the first threshold value $Th_1$, then the comparator 44 outputs a high-level signal to the counter 14, or if the transmission signal Tx is less than the first threshold value $Th_1$, then the comparator 44 outputs a low-level signal to the counter 14.

As in the first embodiment, the counter 14 generates a first pulse signal sequence by arranging output signals from the comparator 44 in such a manner that a point in time when the counter 14 receives a high-level signal from the comparator 44 for the first time after receiving the clock signal C from the clock source 2 serves as a starting point.

The counter 14 stores the first pulse signal sequence in the memory 20.

When the transmission signal Tx is, for example, the transmission signal Tx shown in FIG. 2, the first pulse signal sequence is a signal sequence whose signal level changes in such a manner that "H"->"L"->"H"->"L"->"H".

The comparator 46 compares a reception signal Rx outputted from the current amplifier 11 with the second threshold value $Th_2$ at the same periods as the periods indicated by the period information outputted from the pattern generating unit 42.

If the reception signal Rx is greater than or equal to the second threshold value $Th_2$, then the comparator 46 outputs a high-level signal to each of the counter 17 and the range calculating unit 18.

If the reception signal Rx is less than the second threshold value $Th_2$, then the comparator 46 outputs a low-level signal to each of the counter 17 and the range calculating unit 18.

As in the first embodiment, the counter 17 generates a second pulse signal sequence by arranging output signals from the comparator 46 in such a manner that a point in time when the counter 17 receives a high-level signal from the comparator 46 for the first time after receiving the clock signal C from the clock source 2 serves as a starting point.

The counter 17 outputs the second pulse signal sequence to the degree-of-match calculating circuit 21.

When the reception signal Rx is, for example, the reception signal Rx shown in FIG. 2, the second pulse signal sequence is a signal sequence whose signal level changes in such a manner that "H"->"L"->"H"->"L"->"H".

In addition, when the reception signal Rx is, for example, the reception signal Rx shown in FIG. 5, the second pulse signal sequence is a signal sequence whose signal level changes in such a manner that "H"->"L"->"H"->"L"->"H"->"L"->"L"->"L"->"L"->"L"->"H"->"H"->"L".

In the comparator 16 shown in FIG. 1, when a result of a comparison between the reception signal Rx and the second threshold value $Th_2$ is changed, the signal level of an output signal changes.

Therefore, even under a situation in which the pulse width of the reception signal Rx has increased due to some kind of influence, there is no change in the signal level of an output signal from the comparator 16 shown in FIG. 1.

The comparator 46 shown in FIG. 6 compares the reception signal Rx with the second threshold value $Th_2$ at the same periods as the periods indicated by the period information, and thus, the signal level of an output signal changes on the basis of a result of the comparison.

Therefore, under a situation in which the pulse width of the reception signal Rx has increased due to some kind of influence, the signal level of an output signal from the comparator 46 shown in FIG. 6 changes depending on the situation.

For example, when the pulse width of the reception signal Rx shown in FIG. 2 has increased by twice, the second pulse signal sequence is a signal sequence whose signal level changes in such a manner that "H"->"H"->"L"->"L"->"H"->"H"->"L"->"L"->"H"->"H".

Thus, the comparator 46 shown in FIG. 6 can output a second pulse signal sequence that more conforms to the actual waveform of reflected light $R_L$ than the comparator 16 shown in FIG. 1.

Third Embodiment

A third embodiment describes a laser radar device in which a first signal sequence converting unit 53 converts a transmission signal Tx into a first pulse signal sequence only during a period corresponding to a time range of the transmission signal Tx, and a second signal sequence converting unit 55 converts a reception signal Rx into a second pulse signal sequence only during a period corresponding to the time range of the transmission signal Tx.

Figure 7:
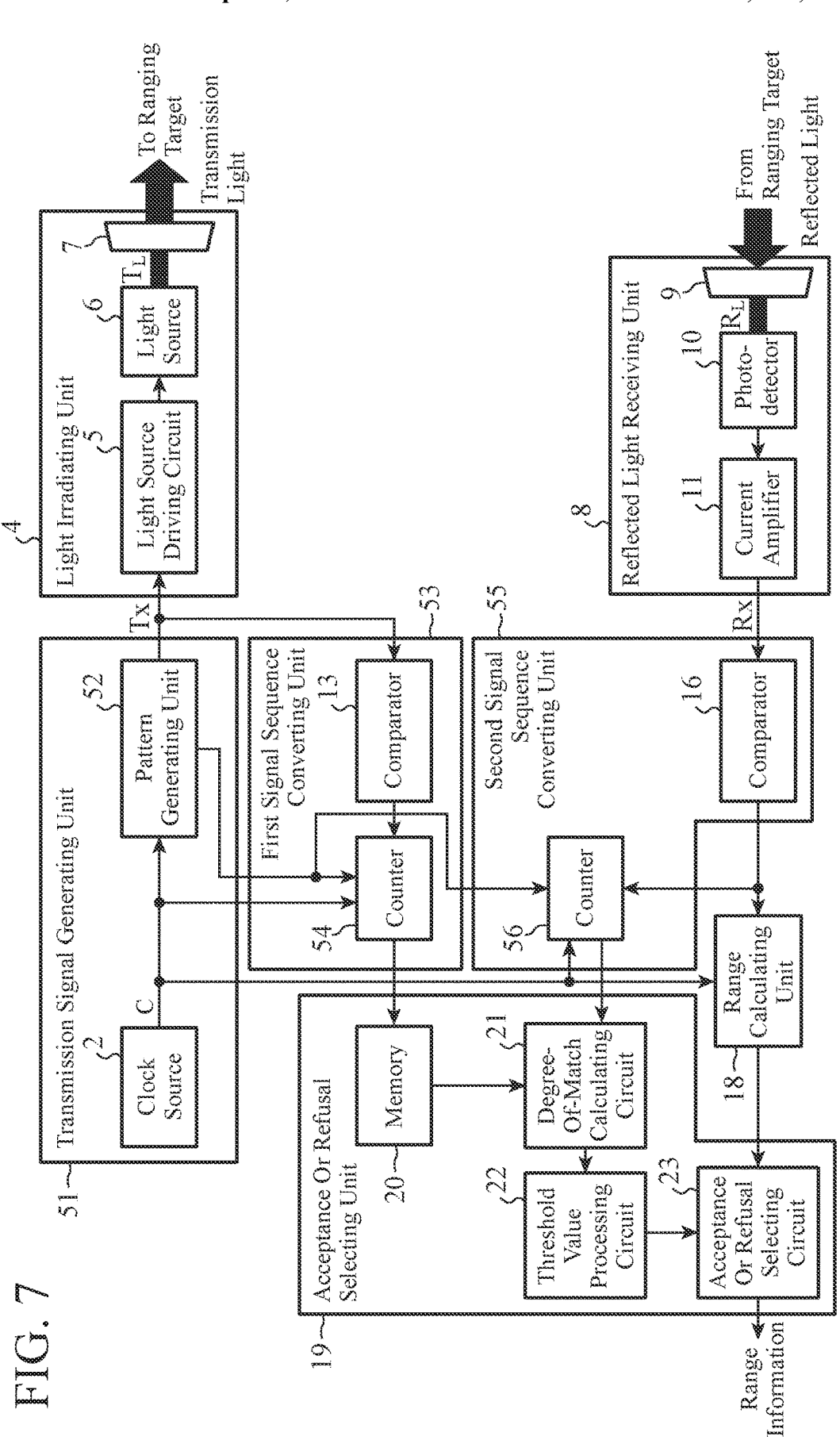
FIG. 7 is a configuration diagram showing a laser radar device according to a third embodiment.

FIG. 7 is a configuration diagram showing a laser radar device according to the third embodiment. In FIG. 7, the same reference signs as those of FIG. 1 indicate the same or corresponding components and thus description thereof is omitted.

A transmission signal generating unit 51 includes the clock source 2 and a pattern generating unit 52.

The transmission signal generating unit 51 generates a transmission signal Tx in synchronization with a clock signal C, and outputs the transmission signal Tx to each of the light irradiating unit 4 and the first signal sequence converting unit 53.

In addition, the transmission signal generating unit 51 outputs time information indicating a time range of the transmission signal Tx to each of the first signal sequence converting unit 53 and the second signal sequence converting unit 55.

The pattern generating unit 52 generates a transmission signal Tx in synchronization with the clock signal C outputted from the clock source 2, and outputs the transmission signal Tx to each of the light source driving circuit 5 and the comparator 13.

In addition, the pattern generating unit 52 outputs time information indicating a time range of the transmission signal Tx to each of a counter 54 and a counter 56.

The first signal sequence converting unit 53 includes the comparator 13 and the counter 54.

When the first signal sequence converting unit 53 receives the clock signal C from the transmission signal generating unit 51, the first signal sequence converting unit 53 converts the transmission signal Tx into a first pulse signal sequence only during a period corresponding to the time range indicated by the time information outputted from the transmission signal generating unit 51, and outputs the first pulse signal sequence to the acceptance or refusal selecting unit 19.

The counter 54 generates a first pulse signal sequence by arranging output signals from the comparator 13 only during a period corresponding to the time range indicated by the time information outputted from the pattern generating unit 52, and stores the first pulse signal sequence in the memory 20.

The second signal sequence converting unit 55 includes the comparator 16 and the counter 56.

When the second signal sequence converting unit 55 receives the clock signal C from the transmission signal generating unit 51, the second signal sequence converting unit 55 converts a reception signal Rx outputted from the reflected light receiving unit 8 into a second pulse signal sequence only during a period corresponding to the time range indicated by the time information outputted from the transmission signal generating unit 51.

The second signal sequence converting unit 55 outputs the second pulse signal sequence to the acceptance or refusal selecting unit 19.

The counter 56 generates a second pulse signal sequence by arranging output signals from the comparator 16 only during a period corresponding to the time range indicated by the time information outputted from the pattern generating unit 52, and outputs the second pulse signal sequence to the degree-of-match calculating circuit 21.

Next, operations of the laser radar device shown in FIG. 7 will be described.

Here, only operations of components that differ from the laser radar device shown in FIG. 1 will be described.

When the pattern generating unit 52 receives a clock signal C from the clock source 2, the pattern generating unit 52 generates a transmission signal Tx whose amplitude changes with the passage of time, in synchronization with the clock signal C and outputs the transmission signal Tx to each of the light source driving circuit 5 and the comparator 13.

For example, the transmission signal Tx shown in FIG. 5 is a signal in which three mountain-shaped waveforms are arranged.

In addition, the pattern generating unit 52 outputs time information indicating a time range of the transmission signal Tx to each of the counter 54 and the counter 56.

For example, in the transmission signal Tx shown in FIG. 5, a period from the rise of the first mountain-shaped waveform to the fall of the third mountain-shaped waveform is the time range of the transmission signal Tx.

As in the first embodiment, the comparator 13 compares the transmission signal Tx outputted from the pattern generating unit 52 with the first threshold value $Th_1$.

If the transmission signal Tx is greater than or equal to the first threshold value $Th_1$, then the comparator 13 outputs a high-level signal to the counter 54, or if the transmission signal Tx is less than the first threshold value $Th_1$, then the comparator 13 outputs a low-level signal to the counter 54.

As with the counter 14 shown in FIG. 1, the counter 54 generates a first pulse signal sequence by arranging output signals from the comparator 13 in such a manner that a point in time when the counter 54 receives a high-level signal from the comparator 13 for the first time after receiving the clock signal C from the clock source 2 serves as a starting point.

Note, however, that unlike the counter 14 shown in FIG. 1, the counter 54 generates a first pulse signal sequence by arranging output signals from the comparator 13 only during a period corresponding to the time range indicated by the time information outputted from the transmission signal generating unit 51.

The counter 54 stores the first pulse signal sequence in the memory 20.

In a case in which the transmission signal Tx is, for example, the transmission signal Tx shown in FIG. 2, the first pulse signal sequence is a signal sequence whose signal level changes in such a manner that "H"->"L"->"H"->"L"->"H".

As in the first embodiment, the comparator 16 compares a reception signal Rx outputted from the current amplifier 11 with the second threshold value $Th_2$.

If the reception signal Rx is greater than or equal to the second threshold value $Th_2$, then the comparator 16 outputs a high-level signal to each of the counter 56 and the range calculating unit 18.

If the reception signal Rx is less than the second threshold value $Th_2$, then the comparator 16 outputs a low-level signal to each of the counter 56 and the range calculating unit 18.

As with the counter 17 shown in FIG. 1, the counter 56 generates a second pulse signal sequence by arranging output signals from the comparator 16 in such a manner that a point in time when the counter 56 receives a high-level signal from the comparator 16 for the first time after receiving the clock signal C from the clock source 2 serves as a starting point.

Note, however, that unlike the counter 17 shown in FIG. 1, the counter 56 generates a second pulse signal sequence by arranging output signals from the comparator 16 only during a period corresponding to the time range indicated by the time information outputted from the transmission signal generating unit 51.

The counter 56 outputs the second pulse signal sequence to the degree-of-match calculating circuit 21.

Therefore, for example, under a situation in which, as shown in FIG. 5, a piece of disturbance pulse light D is included in reflected light $R_L$, the second pulse signal sequence outputted from the counter 17 shown in FIG. 1 is a signal sequence in which four pulse signals are arranged. Thus, the signal level of the second pulse signal sequence changes, for example, in such a manner that "H"->"L"->"H"->"L"->"H"->"L"->"H".

Since the counter 56 shown in FIG. 7 generates a second pulse signal sequence by arranging output signals from the comparator 16 only during a period corresponding to the time range indicated by the time information outputted from the transmission signal generating unit 51, the second pulse signal sequence is a signal sequence in which three pulse signals are arranged. That is, the second pulse signal sequence is a signal sequence in which three pulse signals are arranged without the disturbance pulse light D. Thus, the signal level of the second pulse signal sequence changes, as with the first pulse signal sequence, in such a manner that "H"->"L"->"H"->"L"->"H".

As a result, the degree-of-match calculating circuit 21 can calculate a degree of match between the first pulse signal sequence and the second pulse signal sequence under a situation in which the influence of the disturbance pulse light D is removed.

Fourth Embodiment

A fourth embodiment describes a laser radar device in which a first signal sequence converting unit 31 outputs a pulse signal at timing at which a differentiated waveform of a transmission signal crosses zero, and a second signal sequence converting unit 35 outputs a pulse signal at timing at which a differentiated waveform of a reception signal crosses zero.

Figure 8:
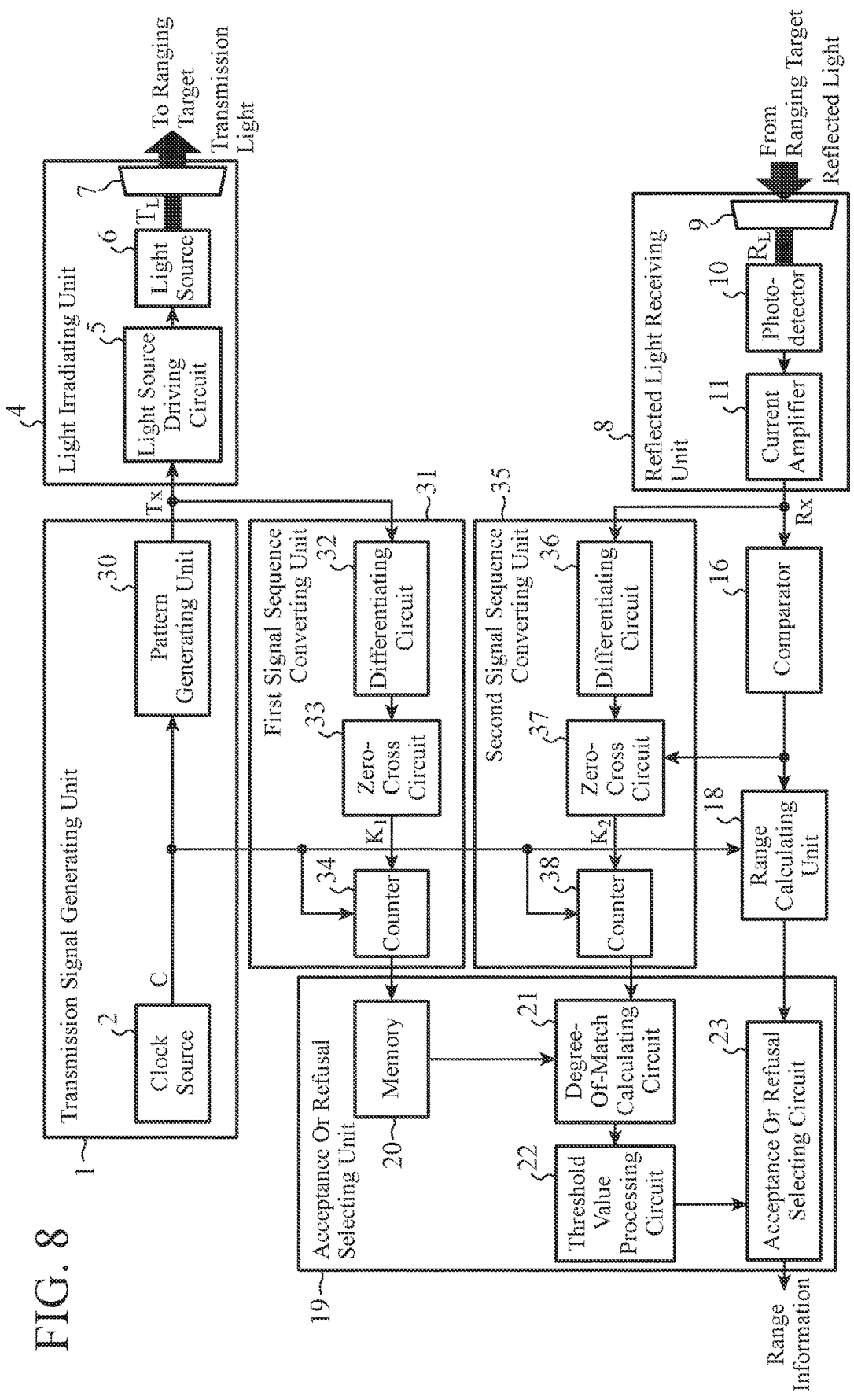
FIG. 8 is a configuration diagram showing a laser radar device according to a fourth embodiment.

FIG. 8 is a configuration diagram showing a laser radar device according to the fourth embodiment. In FIG. 8, the same reference signs as those of FIG. 1 indicate the same or corresponding components and thus description thereof is omitted.

A pattern generating unit 30 generates a transmission signal whose amplitude changes with the passage of time, in synchronization with a clock signal outputted from the clock source 2, and outputs the transmission signal to each of the light source driving circuit 5 and a differentiating circuit 32.

The first signal sequence converting unit 31 includes the differentiating circuit 32, a zero-cross circuit 33, and a counter 34.

The first signal sequence converting unit 31 converts the transmission signal outputted from the transmission signal generating unit 1 into a first pulse signal sequence, and outputs the first pulse signal sequence to the acceptance or refusal selecting unit 19.

The differentiating circuit 32 is a circuit that calculates a differentiated waveform of the transmission signal outputted from the pattern generating unit 30, and outputs the differentiated waveform to the zero-cross circuit 33.

The zero-cross circuit 33 is a circuit that detects timing at which the differentiated waveform outputted from the differentiating circuit 32 crosses zero.

The counter 34 outputs a pulse signal to the memory 20 when zero-cross timing is detected by the zero-cross circuit 33 after the counter 34 receives a clock signal C from the clock source 2.

The second signal sequence converting unit 35 includes a differentiating circuit 36, a zero-cross circuit 37, and a counter 38.

The second signal sequence converting unit 35 converts a reception signal outputted from the reflected light receiving unit 8 into a second pulse signal sequence, and outputs the second pulse signal sequence to the acceptance or refusal selecting unit 19.

The differentiating circuit 36 is a circuit that calculates a differentiated waveform of the reception signal outputted from the current amplifier 11, and outputs the differentiated waveform to the zero-cross circuit 37.

The zero-cross circuit 37 is a circuit that detects timing at which the differentiated waveform outputted from the differentiating circuit 36 crosses zero, only when a high-level signal is being outputted from the comparator 16.

The counter 38 outputs a pulse signal to the degree-of-match calculating circuit 21 when zero-cross timing is detected by the zero-cross circuit 37 after the counter 38 receives the clock signal C from the clock source 2.

Next, operations of the laser radar device shown in FIG. 8 will be described.

Here, only operations of components that differ from the laser radar device shown in FIG. 1 will be described.

Figure 9:
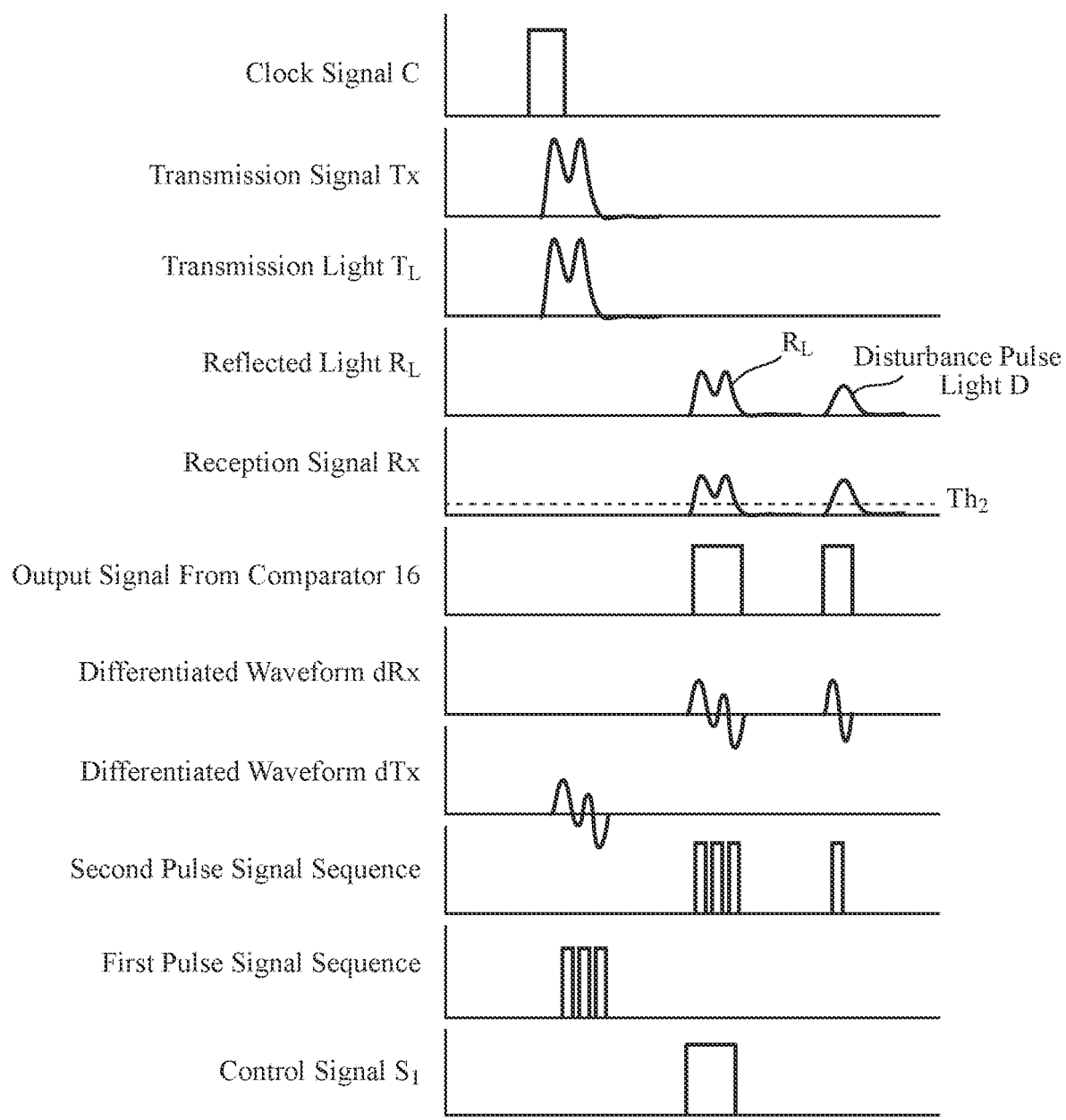
FIG. 9 is an explanatory diagram showing the waveforms of signals outputted from respective components of the laser radar device shown in FIG. 8.

FIG. 9 is an explanatory diagram showing the waveforms of signals outputted from respective components of the laser radar device shown in FIG. 8.

When the pattern generating unit 30 receives a clock signal C from the clock source 2, the pattern generating unit 30 generates a transmission signal Tx whose amplitude changes with the passage of time, in synchronization with the clock signal C.

The pattern generating unit 30 outputs the transmission signal Tx to each of the light source driving circuit 5 and the differentiating circuit 32.

When the differentiating circuit 32 receives the transmission signal Tx from the pattern generating unit 30, the differentiating circuit 32 calculates a differentiated waveform dTx of the transmission signal Tx, and outputs the differentiated waveform dTx to the zero-cross circuit 33.

When the zero-cross circuit 33 receives the differentiated waveform dTx from the differentiating circuit 32, the zero-cross circuit 33 detects timing at which the differentiated waveform dTx crosses zero.

When the zero-cross circuit 33 detects timing at which the differentiated waveform dTx crosses zero, the zero-cross circuit 33 outputs a detection signal $k_1$ to the counter 34.

In an example of FIG. 9, since the differentiated waveform dTx crosses zero three times, the zero-cross circuit 33 detects zero-cross timing three times and outputs three detection signals $k_1$.

Every time the counter 34 receives a detection signal $k_1$ from the zero-cross circuit 33 after receiving the clock signal C from the clock source 2, the counter 34 outputs a pulse signal to the memory 20.

Therefore, in the memory 20, as shown in FIG. 9, a signal sequence including three pulse signals is stored as a first pulse signal sequence.

The first pulse signal sequence obtained at this time is a signal sequence whose signal level changes in such a manner that "H"->"L"->"H"->"L"->"H".

When the differentiating circuit 36 receives a reception signal Rx from the current amplifier 11, the differentiating circuit 36 calculates a differentiated waveform dRx of the reception signal Rx, and outputs the differentiated waveform dRx to the zero-cross circuit 37.

The zero-cross circuit 37 detects timing at which the differentiated waveform dRx outputted from the differentiating circuit 36 crosses zero, only during a period during which a high-level signal is outputted from the comparator 16.

When a low-level signal is being outputted from the comparator 16, the zero-cross circuit 37 does not perform a process of detecting timing at which the differentiated waveform dRx crosses zero, and thus, the power consumption of the zero-cross circuit 37 is reduced.

In addition, even if noise smaller than the second threshold value $Th_2$ is outputted from the current amplifier 11, a signal outputted from the comparator 16 is a low-level signal, and the zero-cross circuit 37 does not perform a process of detecting timing at which the differentiated waveform dRx crosses zero. Therefore, erroneous operation of the zero-cross circuit 37, etc., caused by noise can be prevented.

When the zero-cross circuit 37 detects timing at which the differentiated waveform dRx crosses zero, the zero-cross circuit 37 outputs a detection signal $k_2$ to the counter 38.

In the example of FIG. 9, since a piece of disturbance pulse light D is received in addition to reflected light $R_L$, the differentiated waveform dRx crosses zero four times, and the zero-cross circuit 37 detects zero-cross timing four times and outputs four detection signals $k_2$.

Even when the light intensity of the reflected light $R_L$ is reduced, the changing trends of the waveform of the reflected light $R_L$ do not change almost at all, and thus, the number of times the differentiated waveform dRx crosses zero does not change. Therefore, it is assumed that even when the light intensity of the reflected light $R_L$ is reduced, the zero-cross circuit 37 detects zero-cross timing four times and outputs four detection signals $k_2$.

Every time the counter 38 receives a detection signal $k_2$ from the zero-cross circuit 37 after receiving the clock signal C from the clock source 2, the counter 38 outputs a pulse signal to the degree-of-match calculating circuit 21.

In the example of FIG. 9, a signal sequence in which four pulse signals are arranged is outputted as a second pulse signal sequence from the counter 38 to the degree-of-match calculating circuit 21.

The second pulse signal sequence is a signal sequence whose signal level changes in such a manner that "H"->"L"->"H"->"L"->"H"->"L"->"H".

Subsequent operations are the same as those of the laser radar device shown in FIG. 1 and thus description thereof is omitted.

In the above-described fourth embodiment, the laser radar device is configured in such a manner that the first signal sequence converting unit 31 outputs a pulse signal to the acceptance or refusal selecting unit 19 at timing at which a differentiated waveform of a transmission signal crosses zero, and that the second signal sequence converting unit 35 outputs a pulse signal to the acceptance or refusal selecting unit 19 at timing at which a differentiated waveform of a reception signal crosses zero. Therefore, as with the laser radar device of the first embodiment, the laser radar device of the fourth embodiment can prevent a range that is highly likely to include an error from being outputted as a range to a ranging target when a situation occurs in which the light intensity of reflected light is low.

In the laser radar device of the fourth embodiment, the zero-cross circuit 33 detects timing at which a differentiated waveform dTx outputted from the differentiating circuit 32 crosses zero. In addition, the zero-cross circuit 37 detects timing at which a differentiated waveform dRx outputted from the differentiating circuit 36 crosses zero.

At this time, the zero-cross circuit 33 may detect timing at which the differentiated waveform dTx crosses zero, only when the differentiated waveform dTx outputted from the differentiating circuit 32 is, for example, smaller than an upper limit threshold value and larger than a lower limit threshold value. The upper limit threshold value is larger than (>) the lower limit threshold value.

Likewise, the zero-cross circuit 37 may detect timing at which the differentiated waveform dRx crosses zero, only when the differentiated waveform dRx outputted from the differentiating circuit 36 is, for example, smaller than an upper limit threshold value and larger than a lower limit threshold value.

By limiting zero-cross detection timing of the zero-cross circuits 33 and 37, erroneous detection caused by noise can be prevented.

Fifth Embodiment

A fifth embodiment describes a laser radar device in which a first signal sequence converting unit 61 outputs a pulse signal at timing at which a differentiated waveform of a transmission signal Tx crosses zero only during a period corresponding to a time range of the transmission signal Tx, and in which a second signal sequence converting unit 63 outputs a pulse signal at timing at which a differentiated waveform of a reception signal Rx crosses zero only during a period corresponding to the time range of the transmission signal Tx.

Figure 10:
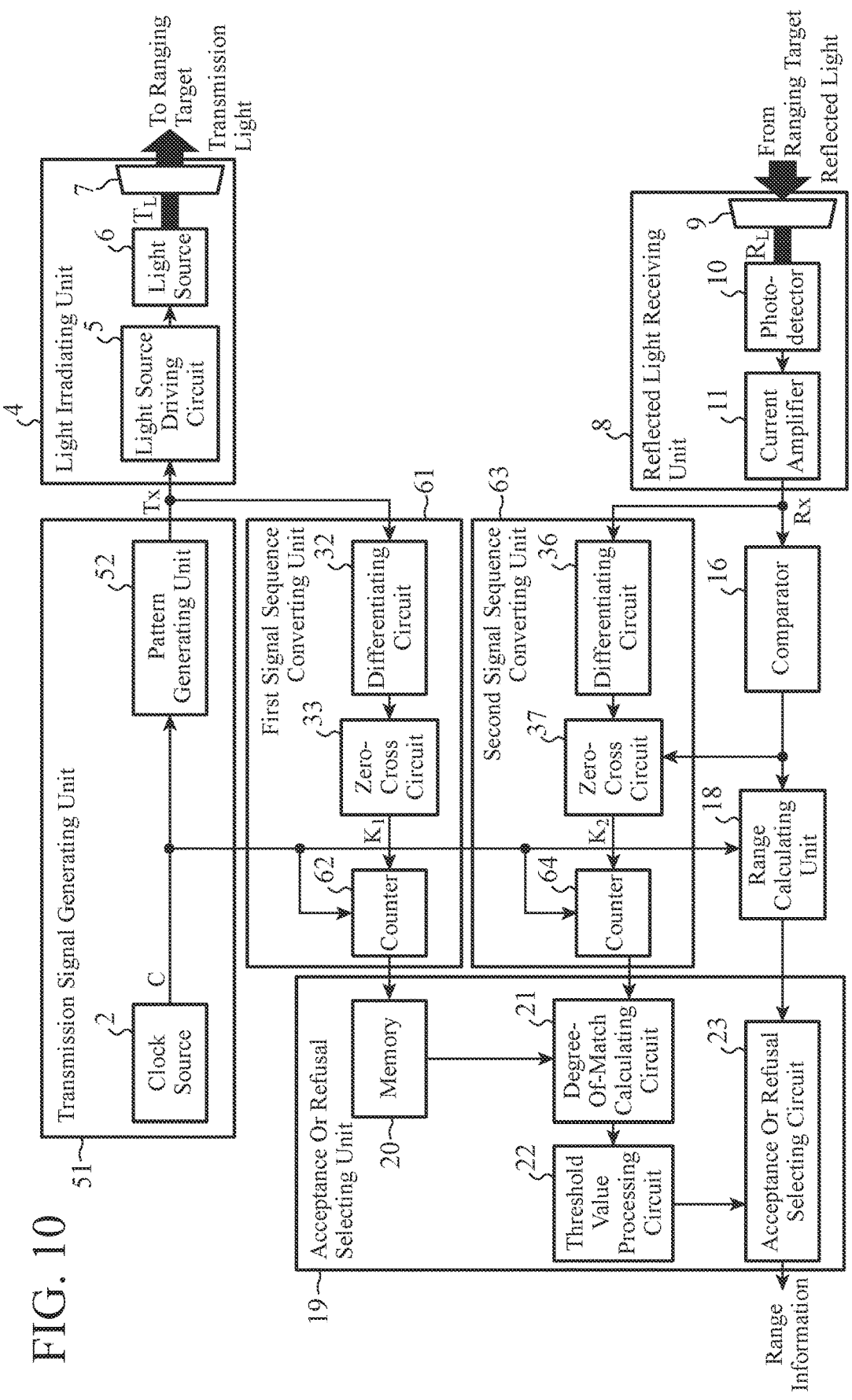
FIG. 10 is a configuration diagram showing a laser radar device according to a fifth embodiment.

FIG. 10 is a configuration diagram showing a laser radar device according to the fifth embodiment. In FIG. 10, the same reference signs as those of FIGS. 7 and 8 indicate the same or corresponding portions and thus description thereof is omitted.

The first signal sequence converting unit 61 includes the differentiating circuit 32, the zero-cross circuit 33, and a counter 62.

The first signal sequence converting unit 61 calculates a differentiated waveform of a transmission signal Tx only during a period corresponding to a time range indicated by time information outputted from the transmission signal generating unit 51, and outputs a pulse signal to the acceptance or refusal selecting unit 19 at timing at which the differentiated waveform crosses zero.

The counter 62 outputs a pulse signal to the memory 20 when zero-cross timing is detected by the zero-cross circuit 33 only during a period corresponding to a time range indicated by time information outputted from the pattern generating unit 52 after the counter 62 receives a clock signal C from the clock source 2.

The second signal sequence converting unit 63 includes the differentiating circuit 36, the zero-cross circuit 37, and a counter 64.

The second signal sequence converting unit 63 calculates a differentiated waveform of a reception signal Rx only during a period corresponding to the time range indicated by the time information outputted from the transmission signal generating unit 51, and outputs a pulse signal to the acceptance or refusal selecting unit 19 at timing at which the differentiated waveform of the reception signal Rx crosses zero.

The counter 64 outputs a pulse signal to the degree-of-match calculating circuit 21 when zero-cross timing is detected by the zero-cross circuit 37 only during a period corresponding to the time range indicated by the time information outputted from the pattern generating unit 52 after the counter 64 receives the clock signal C from the clock source 2.

Next, operations of the laser radar device shown in FIG. 10 will be described.

Here, only operations of components that differ from the laser radar devices shown in FIGS. 7 and 8 will be described.

The counter 62 operates only during a period corresponding to a time range indicated by time information in such a manner that a point in time when the counter 62 receives a detection signal $k_1$ from the zero-cross circuit 33 for the first time after receiving a clock signal C from the clock source 2 serves as a starting point.

Namely, only during a period corresponding to the time range indicated by the time information, the counter 62 outputs a pulse signal to the memory 20 every time the counter 62 receives a detection signal $k_1$ from the zero-cross circuit 33.

The counter 64 operates only during a period corresponding to the time range indicated by the time information in such a manner that a point in time when the counter 64 receives a detection signal $k_2$ from the zero-cross circuit 37 for the first time after receiving the clock signal C from the clock source 2 serves as a starting point.

Namely, only during a period corresponding to the time range indicated by the time information, the counter 64 outputs a pulse signal to the degree-of-match calculating circuit 21 every time the counter 64 receives a detection signal $k_2$ from the zero-cross circuit 37.

As a result, the degree-of-match calculating circuit 21 can calculate a degree of match between a first pulse signal sequence and a second pulse signal sequence, for example, under a situation in which the influence of a disturbance pulse light D such as that shown in FIG. 5 is removed.

Note that in the invention of this application, a free combination of the embodiments, modifications to any component of the embodiments, or omissions of any component in the embodiments are possible within the scope of the invention.

INDUSTRIAL APPLICABILITY

The invention is suitable for a laser radar device for calculating a range to a ranging target.

REFERENCE SIGNS LIST

1: transmission signal generating unit, 2: clock source, 3: pattern generating unit, 4: light irradiating unit, 5: light source driving circuit, 6: light source, 7: transmission antenna, 8: reflected light receiving unit, 9: reception antenna, 10: photodetector, 11: current amplifier, 12: first signal sequence converting unit, 13: comparator, 14: counter, 15: second signal sequence converting unit, 16: comparator, 17: counter, 18: range calculating unit, 19: acceptance or refusal selecting unit, 20: memory, 21: degree-of-match calculating circuit, 22: threshold value processing circuit, 23: acceptance or refusal selecting circuit, 30: pattern generating unit, 31: first signal sequence converting unit, 32: differentiating circuit, 33: zero-cross circuit, 34: counter, 35: second signal sequence converting unit, 36: differentiating circuit, 37: zero-cross circuit, 38: counter, 41: transmission signal generating unit, 42: pattern generating unit, 43: first signal sequence converting unit, 44: comparator, 45: second signal sequence converting unit, 46: comparator, 51: transmission signal generating unit, 52: pattern generating unit, 53: first signal sequence converting unit, 54: counter, 55: second signal sequence converting unit, 56: counter, 61: first signal sequence converting unit, 62: counter, 63: second signal sequence converting unit, 64: counter

The invention claimed is:

1. A laser radar device comprising:
a transmission signal generator to generate a transmission signal;
a light irradiator to convert the transmission signal generated by the transmission signal generator into transmission light, and irradiate a ranging target with the transmission light;
a reflected light receiver to receive, as reflected light, the transmission light reflected by the ranging target, and output a reception signal of the reflected light;
a first signal sequence converter to convert the transmission signal generated by the transmission signal generator into a first pulse signal sequence;
a second signal sequence converter to convert the reception signal outputted from the reflected light receiver into a second pulse signal sequence;
a range calculator to calculate a range to the ranging target from a time difference between a time at which the transmission light is irradiated by the light irradiator and a time at which the reflected light is received by the reflected light receiver; and
acceptance or refusal selecting circuitry to calculate a degree of match between the first pulse signal sequence and the second pulse signal sequence, and accept or refuse the range calculated by the range calculator on a basis of the degree of match, wherein
the second signal sequence converter is configured to output a pulse signal included in the second pulse signal sequence to the acceptance or refusal selecting circuitry at timing at which a differentiated waveform corresponding to a derivative of the reception signal crosses zero, only during a period during which the reception signal outputted from the reflected light receiver is greater than or equal to a second threshold value.

2. The laser radar device according to claim 1, comprising a comparator to compare the reception signal outputted from the reflected light receiver with the second threshold value, and output a high-level signal if the reception signal is greater than or equal to the second threshold value, or output a low-level signal if the reception signal is less than the second threshold value, wherein
the second signal sequence converter is configured to output a pulse signal included in the second pulse signal sequence to the acceptance or refusal selecting circuitry at timing at which the differentiated waveform of the reception signal crosses zero, only during a period during which the high-level signal is outputted from the comparator.

3. A laser radar device comprising:

a transmission signal generator to generate a transmission signal;

a light irradiator to convert the transmission signal generated by the transmission signal generator into transmission light, and irradiate a ranging target with the transmission light;

a reflected light receiver to receive, as reflected light, the transmission light reflected by the ranging target, and output a reception signal of the reflected light;

a first signal sequence converter to convert the transmission signal generated by the transmission signal generator into a first pulse signal sequence;

a second signal sequence converter to convert the reception signal outputted from the reflected light receiver into a second pulse signal sequence;

a range calculator to calculate a range to the ranging target from a time difference between a time at which the transmission light is irradiated by the light irradiator and a time at which the reflected light is received by the reflected light receiver; and acceptance or refusal selecting circuitry to calculate a degree of match between the first pulse signal sequence and the second pulse signal sequence, and accept or refuse the range calculated by the range calculator on a basis of the degree of match, wherein the transmission signal generator is configured to output time information to the second signal sequence converter, the time information indicating a time range of the transmission signal, and the second signal sequence converter is configured to output a pulse signal included in the second pulse signal sequence to the acceptance or refusal selecting circuitry at timing at which a differentiated waveform corresponding to a derivative of the reception signal crosses zero, only during a period corresponding to the time range indicated by the time information.

4. The laser radar device according to claim 3, wherein the transmission signal generator is configured to output the time information to the first signal sequence converter, in addition to outputting to the second signal sequence converter, and the first signal sequence converter is configured to output a pulse signal included in the first pulse signal sequence to the acceptance or refusal selecting circuitry at timing at which a differentiated waveform corresponding to a derivative of the transmission signal crosses zero, only during a period corresponding to the time range indicated by the time information.

5. The laser radar device according to claim 1, wherein the transmission signal generator is configured to generate a transmission signal whose amplitude changes with passage of time, the first signal sequence converter is configured to calculate a differentiated waveform corresponding to a derivative of the transmission signal generated by the transmission signal generator, and output a pulse signal included in the first pulse signal sequence to the acceptance or refusal selecting circuitry at timing at which the differentiated waveform corresponding to the derivative of the transmission signal crosses zero, and the second signal sequence converter is configured to calculate the differentiated waveform of a reception signal outputted from the reflected light receiver.

6. The laser radar device according to claim 3, wherein the transmission signal generator is configured to generate a transmission signal whose amplitude changes with passage of time, the first signal sequence converter is configured to calculate a differentiated waveform corresponding to a derivative of the transmission signal generated by the transmission signal generator, and output a pulse signal included in the first pulse signal sequence to the acceptance or refusal selecting circuitry at timing at which the differentiated waveform corresponding to the derivative of the transmission signal crosses zero, and the second signal sequence converter is configured to calculate the differentiated waveform of a reception signal outputted from the reflected light receiver.

7. The laser radar device according to claim 1, wherein the acceptance or refusal selecting circuitry is configured to compare the degree of match with a third threshold value, and adopt the range calculated by the range calculator if the degree of match is greater than or equal to the third threshold value, or discard the range calculated by the range calculator if the degree of match is less than the third threshold value.

8. The laser radar device according to claim 3, wherein the acceptance or refusal selecting circuitry is configured to compare the degree of match with a third threshold value, and adopt the range calculated by the range calculator if the degree of match is greater than or equal to the third threshold value, or discard the range calculated by the range calculator if the degree of match is less than the third threshold value.

9. The laser radar device according to claim 1, wherein the transmission signal generator is configured to generate a transmission signal whose amplitude changes with passage of time.

10. The laser radar device according to claim 3, wherein the transmission signal generator is configured to generate a transmission signal whose amplitude changes with passage of time.

11. The laser radar device according to claim 1, wherein the transmission signal generator is configured to repeatedly generate transmission signals having different changes in amplitude.

12. The laser radar device according to claim 3, wherein the transmission signal generator is configured to repeatedly generate transmission signals having different changes in amplitude.

* * * * *